US012587460B2

(12) United States Patent
Xu et al.

(10) Patent No.: US 12,587,460 B2
(45) Date of Patent: Mar. 24, 2026

(54) HEALTH MODEL FOR CLOUD SERVICE HEALTH MONITORING

(71) Applicant: MICROSOFT TECHNOLOGY LICENSING, LLC, Redmond, WA (US)

(72) Inventors: Zhangwei Xu, Redmond, WA (US); John Bronn Socha-Leialoha, Bellevue, WA (US); Rajive Kumar, Sammamish, WA (US); Yusuf Tinwala, Bellevue, WA (US); Yingnong Dang, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/642,029

(22) Filed: Apr. 22, 2024

(65) Prior Publication Data

US 2025/0330403 A1      Oct. 23, 2025

(51) Int. Cl.
| *H04L 43/045* | (2022.01) |
| *H04L 43/0817* | (2022.01) |
| *H04L 43/16* | (2022.01) |

(52) U.S. Cl.
CPC ........ *H04L 43/0817* (2013.01); *H04L 43/045* (2013.01); *H04L 43/16* (2013.01)

(58) Field of Classification Search
USPC .......................................................... 709/224
See application file for complete search history.

(56) References Cited

U.S. PATENT DOCUMENTS

| 10,554,518 B1 * | 2/2020 | Troy de Freitas .. H04L 41/0681 |
| 10,616,078 B1 | 4/2020 | Thomas |

(Continued)

FOREIGN PATENT DOCUMENTS

| CN | 107995028 A | 5/2018 |
| CN | 111752805 A | 10/2020 |

(Continued)

OTHER PUBLICATIONS

"Microsoft Cloud Adoption Framework for Azure", Retrieved from: https://learn.microsoft.com/pdf?url=https%3A%2F%2Flearn.microsoft.com%2Fen-us%2Fazure%2Fcloud-adoption-framework%2Ftoc.json, Retrieved Date: Aug. 30, 2023, 4230 Pages.

(Continued)

*Primary Examiner* — Asad M Nawaz
(74) *Attorney, Agent, or Firm* — Newport IP, LLC; Jacob P. Rohwer

(57) ABSTRACT

The techniques described herein automatically correlate the health of cloud resources to a broader health determination for an entity executing within, or supported by, a distributed computing environment. In contrast to the typical manual analysis that is required to make a broader health determination for a specific entity, the techniques generate and use a standard health model that can be applied, or scaled, to detect unhealthy scenarios across a variety of different entities with different owners (e.g., different tenants and/or different cloud resource providers). Furthermore, to meet varying owner perspectives on health, the techniques include a layer on top of the standard health model that enables an owner to provide input that customizes the standard health model for their own entity.

16 Claims, 9 Drawing Sheets

(56)     References Cited

U.S. PATENT DOCUMENTS

| | | | |
|---|---|---|---|
| 10,623,285 B1 | 4/2020 | Shevade et al. | |
| 11,212,195 B1 | 12/2021 | Tamir et al. | |
| 11,991,216 B1 * | 5/2024 | Venkatachari | H04L 63/20 |
| 2011/0119375 A1 * | 5/2011 | Beeco | H04L 41/12 |
| | | | 709/224 |
| 2018/0025126 A1 * | 1/2018 | Barnard | A61B 5/4833 |
| | | | 434/236 |
| 2020/0112497 A1 | 4/2020 | Yenumulapalli et al. | |
| 2020/0127903 A1 * | 4/2020 | Chintala | H04L 41/142 |
| 2020/0136975 A1 * | 4/2020 | Arora | H04L 41/147 |
| 2020/0374182 A1 * | 11/2020 | Kolodner | H04L 41/5009 |
| 2022/0107858 A1 | 4/2022 | Jain et al. | |
| 2022/0210202 A1 * | 6/2022 | Crabtree | G06F 16/2477 |
| 2023/0128837 A1 | 4/2023 | Hu et al. | |
| 2024/0171614 A1 * | 5/2024 | Crabtree | H04L 63/20 |
| 2025/0097133 A1 * | 3/2025 | Chunduri | H04L 43/0817 |
| 2025/0158815 A1 * | 5/2025 | Liu | H04L 9/0891 |

FOREIGN PATENT DOCUMENTS

| | | | |
|---|---|---|---|
| CN | 114911683 A | 8/2022 | |
| CN | 112486767 B | 10/2022 | |
| JP | 5035170 B2 * | 9/2012 | |

OTHER PUBLICATIONS

Extended European Search Report received for European Application No. 25168609.3, mailed on Oct. 1, 2025, 11 Pages.

* cited by examiner

Directed Graph Health Model 202

CRP Service XYZ 210

Geographic Region Western USA 214

Tenant Acme 218

Unhealthy Tenant Service ABC 236

Unhealthy VM Alpha 238

Unhealthy VM Beta 240

Healthy VM Charlie 242

User 234

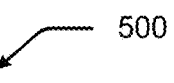

500

GENERATE A DIRECTED GRAPH HEALTH MODEL THAT DEFINES DEPENDENCIES
BETWEEN NODES WITHIN A CLOUD PLATFORM, WHERE THE NODES REPRESENT
LOWER-LEVEL ENTITIES AND HIGHER-LEVEL ENTITIES
502

MONITOR VALUES OF A PLURALITY OF METRICS THAT ARE COLLECTED IN ASSOCIATION
WITH USE OFAN INDIVIDUAL LOWER-LEVEL ENTITY
504

CATEGORIZE THE INDIVIDUAL LOWER-LEVEL ENTITY AS ONE OF HEALTHY OR
UNHEALTHY BY APPLYING AN ANOMALY DETECTION ALGORITHM TO THE VALUES OF
THE PLURALITY OF METRICS
506

DETERMINE A NUMBER OF LOWER-LEVEL ENTITIES HAVE BEEN CATEGORIZED AS
UNHEALTHY, WHEREIN EACH LOWER-LEVEL ENTITY IS CONNECTED TO A HIGHER-LEVEL
ENTITY IN THE DIRECTED GRAPH HEALTH MODEL
508

DETERMINE THAT THE NUMBER OF LOWER-LEVEL ENTITIES SATISFIES A THRESHOLD
ESTABLISHED TO INDICATE WHEN A STATE OF THE HIGHER-LEVEL ENTITY IS
UNHEALTHY
510

ACCESS A RULE ASSOCIATED WITH THE HIGHER-LEVEL ENTITY, THE RULE DEFINING AN
ACTION TO EXECUTE FOR THE HIGHER-LEVEL ENTITY WHEN THE STATE OF THE
HIGHER-LEVEL ENTITY IS UNHEALTHY
512

EXECUTE THE ACTION FOR THE HIGHER-LEVEL ENTITY
514

FIG. 5

HEALTH MODEL FOR CLOUD SERVICE HEALTH MONITORING

BACKGROUND

A cloud platform such as MICROSOFT AZURE, AMA-ZON WEB SERVICES, GOOGLE CLOUD, etc. is configured to provide resources for various tenants. A tenant may be a customer, a business, an organization, a client, an individual user, and so forth. The datacenters and other infrastructure that comprise the cloud platform are constructed with a variety of different types of "cloud" resources (e.g., processing resources, storage resources, networking resources, power resources, temperature control resources) which work together to execute tenant services (e.g., an application) and/or cloud resource provider services that support and enable execution of the tenant services (e.g., a cloud resource provider is tasked with managing an orchestration and deployment service such as KUBERNETES). In some examples, tenants build additional cloud-related services on top of a cloud platform. Consequently, it is difficult to monitor the health of cloud resources given the complexity of the overall system.

SUMMARY

The system described herein implements techniques for automatically correlating the health of cloud resources to a broader health determination for an entity (e.g., a service) executing within, or supported by, a distributed computing environment (e.g., one or more cloud platforms, one or more edge networks, one or more on-premises networks). In contrast to the typical manual analysis that is required to make a broader health determination for a specific service, the techniques described herein generate and use a standard health model that generates a health topology for the particular service and/or all the services executing in the distributed computing environment. The standard health model can be applied, or scaled, to detect unhealthy scenarios and/or health-related state transitions across a variety of different entities with different owners (e.g., different tenants and/or different cloud resource providers). Consequently, the benefits of the health model described herein can be realized by any owner with little to no configuration input needed. Stated alternatively, the health model described herein can scale to different types of entities.

Furthermore, to meet varying owner perspectives on health, the system described herein includes a layer on top of the standard health model that enables a service owner to provide input that customizes the standard health model for their own service. Consequently, the health model described herein is adaptable in order to account for a specific owner's perspective of what makes an entity "healthy" or "unhealthy". In one example, a health model applied to a particular entity is adapted in accordance with a predefined owner health tolerance, which may be outlined in a service level agreement or subscription associated with the service.

In the example described herein, the health model generates a directed graph, and therefore, is referred to as a "directed graph" health model. The system generates the directed graph health model so that the directed graph health model defines dependencies between nodes within a distributed computing environment. A node within the directed graph health model represents an entity. An entity is a unit that can be identified, or registered, within the distributed computing environment. Accordingly, each entity includes an identification parameter (e.g., a name) that distinguishes the entity from other entities.

Different nodes can map to a position in a hierarchy based on the entities the nodes represent. For example, individual cloud resources are entities represented by nodes in the directed graph health model. As described above, an individual cloud resource can include a virtual machine, a storage unit (e.g., an SQL database), a container, a physical server, a network switch, a container registry, a key vault instance, a micro-service of a tenant application, and so forth. Consequently, an individual cloud resource can be a logical unit, a physical unit, or a combination of both. In another example, services are entities represented by nodes in the directed graph health model. In yet another example, geographic regions in which the distributed computing environment operates are entities represented by nodes in the directed graph health model. In a further example, tenants or cloud service providers are entities represented by nodes in the directed graph health model. A single tenant or a single cloud resource provider can provide one or multiple services via the distributed computing environment. The entities discussed above are provided as examples only, and thus, other entities can be contemplated in the context of the standard health model described in this disclosure.

The directed graph health model is configured to reflect a hierarchy for the nodes that represent entities. More specifically, the nodes that represent the cloud resources in the directed graph health model are lower in the hierarchy compared to the nodes that represent the services, the geographic regions in which the distributed computing environment operates, the tenants, and/or or cloud resource service providers. Consequently, the nodes that represent the cloud resources are referred to herein as lower-level nodes and the different types of cloud resources are referred to as lower-level entities. Accordingly, in addition to an identification parameter, each lower-level entity has a type parameter. The different types of lower-level entities include, for example, a virtual machine type lower-level entity, a storage unit type lower-level entity, a container type lower-level entity, a physical server type lower-level entity, a network switch type lower-level entity, a container registry type lower-level entity, a key vault instance type lower-level entity, or a micro-service type lower-level entity.

In contrast, the nodes that represent the services, the geographic regions in which the distributed computing environment operates, the tenants, and/or the cloud resource providers are referred to herein as higher-level nodes that represent different types of higher-level entities. Accordingly, in addition to an identification parameter, each higher-level entity has a type parameter. The different types of higher-level entities include, for example, a tenant service type higher-level entity, a cloud resource provider service type higher-level entity, a geographic region type higher-level entity, a tenant type higher-level entity, or a cloud resource provider type higher-level entity.

Generally, a higher-level entity represented by a higher-level node is dependent upon (e.g., contains) multiple lower-level entities represented by lower-level nodes. For example, a particular service executing in, or supported by, the distributed computing environment is dependent upon the execution or use of hundreds or thousands of cloud resources (e.g., virtual machines, storage units, containers, physical servers, network switches, container registries, micro-services, and/or key vault instances). In another example, a particular geographic region defined by a tenant or an operator of the distributed computing environment is dependent upon the execution or use of hundreds, thousands, hundreds of thousands, or even millions of cloud resources. In yet another example, the day-to-day operations of a particular tenant (e.g., a banking company, a retail company, a restaurant chain) is dependent upon the execution or use of hundreds or thousands of cloud resources. Moreover, any given lower-level entity can be a health contributor to multiple different higher-level entities.

To capture these dependencies, the directed graph health model includes edges that connect respective pairs of nodes. In one example, an edge represents the dependency between a higher-level node that represents a higher-level entity and a lower-level node that represents a lower-level entity. Additionally, an edge can represent a dependency between a pair of higher-level nodes that represent a pair of higher-level entities. For example, if a service is executed in a particular geographic region, the service depends on the particular geographic region. An edge can also represent a dependency between a pair of lower-level nodes that represent a pair of lower-level entities. For example, data processed by a virtual machine may be processed in accordance with keys retrieved from a key vault instance, and thus, the virtual machine depends on the key vault instance. Even further, an edge can represent a broader association between two nodes, if not a dependency.

The system described herein is configured to monitor values of a plurality of metrics that are collected in association with an individual lower-level entity. The metrics for which values are collected and monitored can vary based on the type of cloud resource. The metrics for which values are collected and monitored can include central processing unit usage and/or capacity, memory usage and/or capacity, temperature of a hardware element, queue length, and so forth. Additionally, the metrics for which values are collected and monitored can include service level indicator metrics such as latency (e.g., a measure of how long it takes to return a response to a request), error rate (e.g., a number of requests that encounter an error compared to a total number of requests processed), throughput (e.g., a measure of requests handled per second), durability (e.g., a measure that tracks the resiliency and ability to maintain data integrity over time), and so forth.

Additionally, the system may receive health reports from disparate monitoring systems and the health reports can provide information that includes monitored metric values and/or conclusions of a specific scenario or test implemented with respect to an individual lower-level entity. For example, a synthetic "runner" system periodically executes a specific scenario on one or more lower-level entities and submits a health report indicating either a success or a failure of the specific scenario.

The system can apply an anomaly detection algorithm to an aggregation of the metric values and/or health reports in order to categorize a state of the individual lower-level entity into one of a predefined set of lower-level health signal categories. In one example further discussed herein, the predefined set of lower-level health signal categories includes "healthy", "unhealthy", and "unknown".

The anomaly detection algorithm can be specific to a type of a lower-level entity. In one example, the system executes the anomaly detection algorithm to determine whether value(s) for a specific metric is above or below a threshold value established to indicate a healthy scenario or an unhealthy scenario. The system applies the anomaly detection algorithm continuously in real-time, in accordance with a predefined schedule (e.g., on values collected every minute, every ten minutes, every thirty minutes), or on-demand.

The anomaly detection algorithm can be a dynamic anomaly detection algorithm that implements time-based adjustments to a range of accepted or expected values for a metric over time by learning the aforementioned higher threshold value to define the top of the range and the aforementioned lower threshold value to define the bottom of the range. Alternatively, the anomaly detection algorithm can use static thresholds to define the top and the bottom of the range. In other examples, the anomaly detection algorithm detects pattern changes, frequency changes, or other types of changes that signal an anomaly related to a state transition into one of the predefined set of lower-level health categories.

Accordingly, the threshold values used in the anomaly detection algorithm are established for individual metrics. In one example, the anomaly detection algorithm is configured to apply weighted parameters to the determinations for individual metrics in order to identify scenarios where the monitored metrics, as an aggregate, indicate that the lower-level entity is unhealthy. Stated alternatively, the anomaly detection algorithm is configured to determine when the collected values, considered as an aggregate across a plurality of metrics, indicate that the performance of the lower-level entity is being impacted in a negative manner. In other examples, a machine learning model can be applied to determine when a combination of health indicators for lower-level entities qualifies as a state transition into one of the predefined set of lower-level health categories.

In various examples, the anomaly detection algorithm calculates a normalized health score for the lower-level entity such that the output is a value between zero and one. The categorization of the lower-level entity as "healthy" or "unhealthy" can be based on a threshold implemented with respect to the range of the normalized health score. For example, a normalized health score below "0.70" or 70% amounts to an unhealthy state for the lower-level entity. Therefore, the normalized health score can be used as a confidence signal for the broad health state categorization. Continuing the example above with respect to the threshold, the system has high confidence that a lower-level entity with a normalized health score of "0.25" is unhealthy but the system has low confidence that another lower-level entity with a normalized health score of "0.65" is unhealthy. Alternatively, the range for a health score can be a predefined number of standard deviations from a normal acceptable (e.g., healthy) range.

The system then uses the directed graph health model configured with the health signal categories for the lower-level entities and lower-level nodes to determine when a higher-level entity is unhealthy or when a higher-level entity experiences a state transition into one of a predefined set of higher-level health categories. The predefined set of higher-level health signal categories can include "healthy", "unhealthy", "degraded", and "unknown". The determination uses the dependencies, or edges, in the directed graph health model. For example, the system determines that a number of unhealthy lower-level entities, represented by lower-level nodes connected to a higher-level node of a higher-level entity, satisfies a threshold established to indicate when the higher-level entity is unhealthy. In one example, the threshold defines a percentage of a total number of lower-level entities connected to the higher-level entity in the directed graph health model. The total number of lower-level entities connected to the higher-level entity can be determined based on an "active" characteristic (e.g., each lower-level entity is currently in use or executing). The percentage and the total number of lower-level entities can be specific to a type of lower-level entity. Alternatively, the percentage and the total number of lower-level entities can be applied across a plurality of different types of lower-level entities connected to the higher-level entity in the directed graph health model via respective edges.

To illustrate, the threshold may be set to indicate that if more than twenty percent of active virtual machines that support a transaction processing service are unhealthy, then the transaction processing service is also unhealthy. However, if less than twenty percent of virtual machines that support the transaction processing service are unhealthy, then the transaction processing service is still healthy. To further illustrate, the threshold may be set to indicate that a data storage service is unhealthy if more than ten percent of the data storage service's SQL databases are determined to be unhealthy for a threshold period of time (e.g., ten minutes).

The threshold established to indicate when the state of the higher-level entity is unhealthy can be learned using a machine learning model configured to predict when the performance of the higher-level entity is degraded to a minimum threshold performance. The machine learning model can be any type of predictive model that can be applied to features extracted from scenarios where the health of a higher-level entity has been determined. For example, during a training stage, the machine learning model is trained using a training data set that includes labeled health states (e.g., an indication of performance) for the higher-level entity (e.g., healthy, unhealthy, degraded, unknown). The feature extraction performed with respect to the training data set can reflect the current health states of each of the lower-level entities upon which the higher-level entity depends. Consequently, the machine learning model is trained to map the aggregate health of the lower-level entities to a threshold that reflects a state transition for the higher-level entity. The machine learning model can use any one of neural networks (e.g., convolutional neural networks, recurrent neural networks such as Long Short-Term Memory), Gated Adaptive Network for Deep Automated Learning of Features, Naïve Bayes, k-nearest neighbor algorithm, majority classifier, support vector machines, random forests, boosted trees, Classification and Regression Trees (CART), and so on in order to predict when the performance of the higher-level entity is degraded to a minimum threshold performance. The machine learning enables any tenant or cloud resource provider to benefit from the standard health model described herein, as no specific tenant input or cloud resource provider input is needed.

Moreover, when the higher-level entity is a service, the threshold established to indicate when the state of the higher-level entity transitions (e.g., becomes unhealthy) may be specific to a classification of service (e.g., a transaction processing service, a messaging service, a security service). For example, the training data set described in the previous paragraph can be sorted according to different classifications of the higher-level entity, so different machine learning models can establish different thresholds. The classification and the machine learning enables any tenant or cloud resource provider to benefit from the standard health model described herein, as no specific tenant input or cloud resource provider input is needed.

In alternative examples, the threshold established to indicate when the state of the higher-level entity transitions can be defined by an owner of the higher-level entity (e.g., a tenant) to impress their own perspective on meaningful health states (e.g., whether the higher-level entity is healthy or unhealthy). Accordingly, while the health model described herein can be a standard health model in its original form, it can include an adaptable layer that enables tenant and/or cloud resource provider customization.

In response to determining that a higher-level entity is unhealthy or that the higher-level entity has experienced a state transition into one of the predefined set of higher-level health categories, the system is configured to access a rule associated with the higher-level entity. The rule defines an action to execute for the higher-level entity. Based on the accessed rule, the system executes the action for the higher-level entity. For example, the rule can require that the system provide, to an owner of the higher-level entity, a notification indicating that the state of the higher-level entity is unhealthy. In another example, the rule can require that the system allocate cloud resources (e.g., additional virtual machines) to the higher-level entity to transition the state of the higher-level entity from unhealthy to healthy. In yet another example, the rule can require that the system implement a set of mitigation measures on the number of lower-level entities to transition the state of the higher-level entity from unhealthy to healthy (e.g., implement a reboot sequence on unhealthy machines; second machines with degraded performance from their higher-level entities to allow the degraded machines to: restore themselves to a healthy state, run updates, or further diagnose issues with the degraded machines).

As part of the customization process, the directed graph health model enables an owner of a higher-level entity to provide input that defines the higher-level entity (e.g., establish a type of higher-level entity, create an identification parameter for the higher-level entity), the threshold used to determine when a state of the higher-level entity transitions into a predefined higher-level health category, and the rule that guides the action executed in response to determining when the state of the higher-level entity transitions into the predefined higher-level health category.

In various examples, the system described herein generates the directed graph health model so that it can be displayed on a display device along with a graphical indication that the state of the higher-level entity is in one of the predefined set of higher-level health categories. The system can receive a user selection of the higher-level entity via the directed graph health model displayed on the display device. Based on the user selection, the system can generate, for display, the identification parameters associated with the number of lower-level entities that have contributed to the health determination for a higher-level entity.

In further examples, the system can receive another user selection of another higher-level entity via the directed graph health model. If the higher-level entity is connected to the other higher-level entity via a respective edge in the directed graph health model, the system can update the display of the identification parameters such that the number of lower-level entities that have been categorized as unhealthy is reduced to those that are connected to both the higher-level entity and the other higher-level entity in the directed graph health model. For example, after viewing a number of lower-level entities that are unhealthy with respect to a service, a user can view a smaller number of lower-level entities that are unhealthy in a specific geographic region in which the service operates (e.g., the smaller number of lower-level entities are common to both the service and the geographic region).

As further described below, the technical benefits of the techniques described herein are able to correlate the health of lower-level cloud resources to a broader health determination for a higher-level entity in a manner that is not hindered when a large number of alerts are triggered at the cloud resource level. Consequently, the health model described herein is equipped with tools that reduce the noise created by the large number of alerts and limit the amount of information that needs to be processed or manually reviewed. Furthermore, the health model is configured to effectively and efficiently model the health of a service in a manner that can be applied to a variety of different tenant and/or cloud resource provider services, while still being able to adapt to a specific service owner's perspective of what makes a service healthy or unhealthy.

Furthermore, the techniques described herein use structured data rather than unstructured data that requires domain expertise. Stated alternatively, the data used to determine health is no longer siloed for a domain expert. Rather, other users who are not domain experts can understand the service health even if these other users did not build the standard health model.

This Summary is provided to introduce a selection of concepts in a simplified form that are further described blow in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

FIG. 5 is a flowchart depicting an example process for correlating the health of cloud resources to a broader health determination for an entity executing within a distributed computing environment.

DETAILED DESCRIPTION

Figure 1:
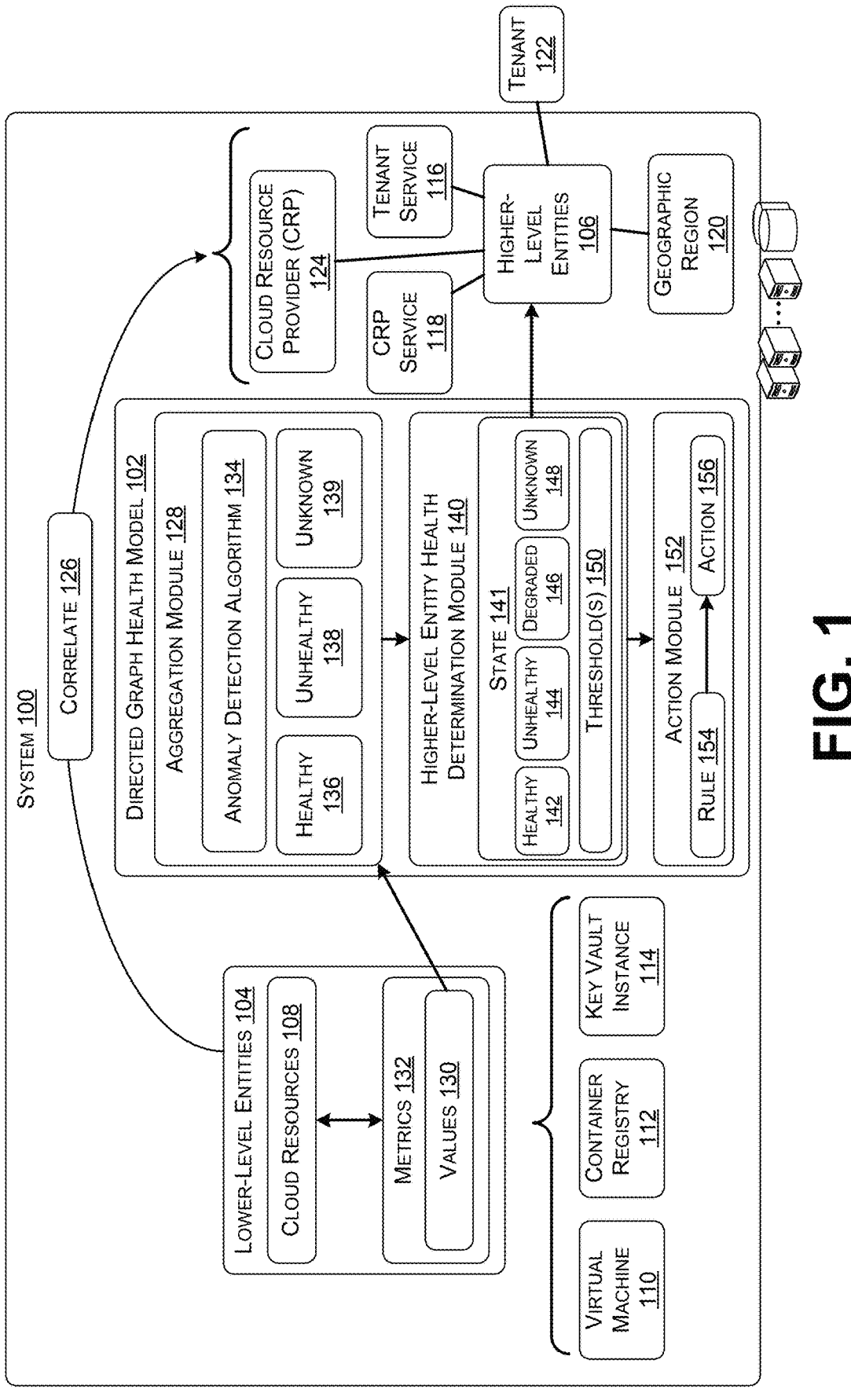
FIG. 1 illustrates an example environment in which a system, such as a distributed computing environment, automatically correlates the health of cloud resources to a broader health determination for an entity executing within, or supported by, the system.

The system described herein implements techniques for automatically correlating the health of cloud resources to a broader health determination for an entity executing within, or supported by, a distributed computing environment. In contrast to the typical manual analysis that is required to make a broader health determination for a specific service, the techniques described herein generate and use a standard health model that can be applied, or scaled, to determine health information across a variety of different entities with different owners (e.g., different tenants and/or different cloud resource providers). Consequently, the benefits of the health model described herein can be realized by any entity owner with little to no configuration input needed. Stated alternatively, the health model described herein can scale to different types of entities.

Furthermore, to meet varying owner perspectives on health, the system described herein includes a layer on top of the standard health model that enables an owner to provide input that customizes the standard health model for their own entity. Consequently, the health model described herein is adaptable in order to account for a specific owner's perspective of what makes an entity "healthy" or "unhealthy", for example. In one example, a health model applied to a particular entity is adapted in accordance with a predefined owner health tolerance, which may be outlined in a service level agreement or subscription associated with the entity.

Existing approaches to monitoring the health of the cloud resources fail to provide a standard, holistic experience with regard to detection and/or mitigation when the health of a particular service is in question. Stated alternatively, existing health monitoring systems narrowly focus on monitoring the health of individual cloud resources based on a metric (e.g., incoming request queue length) or a log (e.g., a number of registered errors) specifically collected with respect to the individual cloud resource. An individual cloud resource is an identifiable unit that can be dynamically associated with (e.g., allocated) and disassociated from (e.g., deallocated) the execution of a service.

As a result of the narrowly focused efforts, existing health monitoring systems do a poor job of automatically correlating the health of cloud resources to a broader health determination for a particular service. Rather, manual analysis is often required to determine the broader health for the particular service (e.g., when the particular service is unhealthy). Additionally, existing health monitoring systems are configured to generate alerts at the cloud resource level on a per metric basis, which leads to a large number of alerts to process. To make this problem worse, many of the alerts are duplicate alerts or alerts that point to the same issue. The correlation of the health of the cloud resources to a broader health determination for a particular service is further hindered when a large number of alerts overwhelms existing monitoring systems. That is, existing health monitoring systems are typically unable to efficiently sift through the noise caused by large number of alerts, particularly when many of the alerts are duplicate alerts or alerts that point to the same issue.

Consequently, existing health monitoring systems are unable to effectively and efficiently model the health of a service in a manner that can be applied to a variety of different tenant and/or cloud resource provider services. Nor are the existing health monitoring systems configured to adapt to a specific service owner's perspective of what makes a service "healthy" or "unhealthy" (e.g., the owner of a service can be a tenant or a cloud resource provider). Adapting to a specific service owner's perspective of what makes a service healthy or unhealthy is important because health is often viewed differently by service owners, which leads to service owner dissatisfaction.

FIG. 1 illustrates an example environment in which a system 100 automatically correlates the health of cloud resources to a broader health determination for an entity executing within, or supported by, the system 100. The system 100 can be a distributed computing environment that includes devices that are part of one or more cloud platforms, one or more on-premises networks, and/or one or more edge networks. For example, the system 110 can monitor lower-level entities configured in a cloud platform (e.g., a datacenter), configured at a remote tenant location (e.g., a factory) via an on-premises network, or configured as part of an edge network between the on-premises network and the cloud platform. The system 100 includes a directed graph health model 102. As described below with respect to FIG. 2, the directed graph health model 102 defines dependencies between nodes within the system 100. A node represents an entity that is identified, or registered, within the system 100.

The directed graph health model 102 is configured to reflect a hierarchy for the nodes that represent entities. More specifically, nodes can represent lower-level entities 104 and higher-level entities 106. The lower-level entities 104 include cloud resources 108 that can be individually allocated to the higher-level entities 106. An individual cloud resource 108 can be a logical unit, a physical unit, or a combination of both. As shown in FIG. 1, examples of an individual cloud resource 108 can include a virtual machine 110, a container registry 112, and a key vault instance 114. Other examples of cloud resources 108 include a storage unit (e.g., an SQL database), a container, a physical server, a network switch, a micro-service, and so forth.

Also shown in FIG. 1, examples of a higher-level entity 106 include a tenant service 116, a cloud resource provider (CRP) service 118, a geographic region 120 in which the system 100 operates, a tenant 122 (e.g., the identity of the tenant that may implement multiple different services in a distributed computing environment), and a CRP 124 (e.g., the identity of the CRP that may implement multiple different administrative or support services in a distributed computing environment).

The nodes that represent the lower-level entities 104 in the directed graph health model 102 are lower in the hierarchy compared to the nodes that represent the higher-level entities 106. Consequently, the nodes that represent the lower-level entities 104 are referred to as lower-level nodes. The different types of lower-level entities 104 include, for example, a virtual machine type lower-level entity, a storage unit type lower-level entity, a container type lower-level entity, a physical server type lower-level entity, a network switch type lower-level entity, a container registry type lower-level entity, a key vault instance type lower-level entity, or a micro-service type lower-level entity. The types of lower-level entities discussed above are provided as examples only, and thus, other types of lower-level entities can be contemplated in the context of the directed graph health model 102 described in this disclosure.

In contrast, the nodes that represent the higher-level entities 106 are referred to as higher-level nodes. The different types of higher-level entities 106 include, for example, a tenant service type higher-level entity, a cloud resource provider service type higher-level entity, a geographic region type higher-level entity, a tenant type higher-level entity, or a cloud resource provider type higher-level entity. The types of higher-level entities discussed above are provided as examples only, and thus, other types of higher-level entities can be contemplated in the context of the directed graph health model 102 described in this disclosure.

Generally, a higher-level entity 106 represented by a higher-level node is dependent upon (e.g., contains) multiple lower-level entities 104 represented by lower-level nodes. For example, a particular tenant service 116 executing in, or supported by, the system 100 is dependent upon the execution or use of hundreds or thousands of cloud resources 108 (e.g., virtual machines 110, container registries 112, and/or key vault instances 114). In another example, a particular geographic region 120 defined by a tenant or an operator of the system 100 is dependent upon the execution or use of hundreds, thousands, hundreds of thousands, or even millions of cloud resources 108. In yet another example, the day-to-day operations of a particular tenant 122 (e.g., a banking company, a retail company, a restaurant chain) is dependent upon the execution or use of hundreds or thousands of cloud resources 108. Moreover, any given lower-level entity can be a health contributor to multiple different higher-level entities.

Consequently, the directed graph health model 102 is configured to correlate 126 health determinations for the lower-level entities 104 to broader health determinations for the higher-level entities 106. To do this, the directed graph health model 102 implements an aggregation module 128 to monitor values 130 of a plurality of metrics 132 that are collected in association with an individual lower-level entity 104, or cloud resource 108. The metrics 132 for which values 130 are collected and monitored can vary based on the type of lower-level entity 104. The metrics 132 for which values 130 are collected and monitored can include central processing unit usage and/or capacity, memory usage and/or capacity, temperature of a hardware element, queue length, and so forth. Additionally, the metrics 132 for which values 130 are collected and monitored can include service level indicator metrics such as latency (e.g., a measure of how long it takes to return a response to a request), error rate (e.g., a number of requests that encounter an error compared to a total number of requests processed), throughput (e.g., a measure of requests handled per second), durability (e.g., a measure that tracks the resiliency and ability to maintain data integrity over time), and so forth.

Additionally, the directed graph health model 102 may receive health reports from disparate monitoring systems and the health reports can provide information that includes monitored metric values and/or conclusions of a specific scenario or test implemented with respect to an individual lower-level entity 104. For example, a synthetic "runner" system periodically executes a specific scenario on one or more lower-level entities 104 and submits a health report indicating either a success or a failure of the specific scenario.

The aggregation module 128 applies an anomaly detection algorithm 134 to an aggregation of the values 130 collected and/or the health reports received in order to categorize a state of the individual lower-level entity 104 into one or more of a predefined set of lower-level health categories. In one example, the predefined set of lower-level health categories includes "healthy" 136, "unhealthy" 138, and "unknown" 139.

The anomaly detection algorithm 134 can be specific to a type of a lower-level entity 104. The aggregation module 128 executes the anomaly detection algorithm 134 to determine whether value(s) 130 for a specific metric 132 is/are above or below a threshold value established to indicate a healthy scenario or an unhealthy scenario. The aggregation module 128 can apply the anomaly detection algorithm 134 continuously in real-time, in accordance with a predefined schedule (e.g., on values 130 collected every minute, every ten minutes, every thirty minutes), or on-demand. In one example, the anomaly detection algorithm 134 is a dynamic anomaly detection algorithm that implements time-based adjustments to a range of accepted or expected values 130 for a metric 132 over time by learning the aforementioned higher threshold value to define the top of the range and/or the aforementioned lower threshold value to define the bottom of the range. In another example, the anomaly detection algorithm 134 can use static thresholds to define the top and/or the bottom of the range. In other examples, the anomaly detection algorithm 134 detects pattern changes, frequency changes, or other types of changes that signal an anomaly related to a state transition.

Accordingly, the threshold values used in the anomaly detection algorithm 134 are established for individual metrics 132. However, the anomaly detection algorithm 134 is configured to apply weighted parameters to the determinations for individual metrics 132 in order to identify scenarios where the metrics 132, as an aggregate, indicate that the lower-level entity 104 is no longer healthy 136, but rather unhealthy 138. Stated alternatively, the anomaly detection algorithm 134 is configured to determine when the collected values 130, considered as an aggregate across a plurality of metrics 132, indicate that the performance of the lower-level entity 104 is being impacted in a negative manner (e.g., the lower-level entity cannot meet defined requirements in service level agreement). In other examples, a machine learning model can be applied to determine when a combination of health indicators for lower-level entities 104 indicates qualification into one of the predefined set of lower-level health categories.

In various examples, the anomaly detection algorithm 134 calculates a normalized health score for the lower-level entity 104 such that the output is a value between zero and one. The categorization of the lower-level entity 104 as healthy 136 or unhealthy 138 can be based on a threshold implemented with respect to the range of the normalized health score. For example, a normalized health score below "0.70" or 70% amounts to an unhealthy 138 state for the lower-level entity 104. Therefore, the normalized health score can be used as a confidence signal. Continuing the example above with respect to the threshold, the aggregation module 128 has higher confidence that a lower-level entity with a normalized health score of "0.25" is unhealthy but the system has lower confidence that another lower-level entity with a normalized health score of "0.65" is unhealthy. Alternatively, the range for a health score can be a predefined number of standard deviations from a normal acceptable (e.g., healthy) range.

The anomaly detection algorithm 134 determines that a health of a lower-level entity 104 is unknown 139 when a state of the lower-level entity 104 is indeterministic because there is an insufficient amount of data (e.g., metrics 132 and/or values 130) to be able to determine that the lower-level entity 104 is either healthy 136 or unhealthy 138.

In various examples, a tenant 122 or CRP 124 can customize settings to create their own custom sections of the directed graph health model 102. For example, a log analytics team for a cloud platform can create a custom definition via the aggregation module 128 for determining the health of a lower-level entity 104.

The directed graph health model 102 further includes a higher-level entity health determination module 140 that receives the health signal categories on a per lower-level entity 104 basis (e.g., healthy 136, unhealthy 138, or unknown 139) and uses the health signal categories to determine that a state 141 of a higher-level entity 106 is in one of a predefined set of higher-level health categories. In one example, the predefined set of higher-level health categories includes healthy 142, unhealthy 144, degraded 146, and unknown 148. To do this, the higher-level entity health determination module 140 uses thresholds 150.

For example, the higher-level entity health determination module 140 determines that a number of unhealthy lower-level entities 104, represented by lower-level nodes connected to a higher-level node of a higher-level entity 106, satisfies a threshold 150 established to indicate when the higher-level entity 106 is unhealthy 144.

In another example, the higher-level entity health determination module 140 determines that a number of lower-level entities 104 with an unknown 139 health state, which represent lower-level nodes connected to a higher-level node of a higher-level entity 106, satisfies a threshold 150 established to indicate when the health of higher-level entity 106 is unknown 148, or indeterministic. The unknown states can indicate an issue external to the lower-level entities such as a networking problem or power issues that prevents the telemetry data (e.g., metrics 132 and/or values 130) from being collected.

In yet another example, the higher-level entity health determination module 140 determines that a number of unhealthy lower-level entities 104, represented by lower-level nodes connected to a higher-level node of a higher-level entity 106, satisfies a threshold 150 established to indicate when the higher-level entity 106 is degraded 146. A degraded 146 state means the higher-level entity 106 is on its way to being in the unhealthy 144 state.

In one example, a threshold 150 defines a percentage of a total number of lower-level entities 104 connected to the higher-level entity 106 in the directed graph health model 102. The total number of lower-level entities 104 connected to the higher-level entity 106 can be determined based on an "active" characteristic (e.g., each lower-level entity 104 is currently in use or executing). The percentage and the total number of lower-level entities 104 can be specific to a type of lower-level entity 104. Alternatively, the percentage and the total number of lower-level entities can be applied across a plurality of different types of lower-level entities 104 connected to the higher-level entity 106 in the directed graph health model 102.

To illustrate, the threshold 150 may be set to indicate that if more than twenty percent of active virtual machines that support a transaction processing service are unhealthy, then the transaction processing service is also unhealthy. However, if less than twenty percent of virtual machines that support the transaction processing service are unhealthy, then the transaction processing service is still healthy. To further illustrate, the threshold 150 may be set to indicate that a data storage service is unhealthy if more than ten percent of the data storage service's SQL databases are determined to be unhealthy for a threshold period of time (e.g., ten minutes).

In response to determining that a higher-level entity 106 is currently in one of the aforementioned states 141, the system 100 is configured to implement an action module 152 to access a rule 154 associated with the state of the higher-level entity 106. The rule 154 defines an action 156 to execute for the higher-level entity 106 based on its state. For example, the rule 154 can require that the action module 152 provide, to an owner of the higher-level entity 106, a notification indicating that the state of the higher-level entity 106 is unhealthy 144, degraded 146, or unknown 148. In another example, the rule 154 can require that the action module 152 allocate cloud resources (e.g., additional virtual machines) to the higher-level entity 106 to transition the state of the higher-level entity from unhealthy 144 back to healthy 142. In yet another example, the rule 154 can require that the action module 152 implement a set of root-cause analysis and mitigation measures on the number of lower-level entities 104 that are unhealthy 138 in order to transition the state of the higher-level entity 106 from unhealthy 144 back to healthy 142 (e.g., implement a reboot sequence on unhealthy machines; second machines with degraded performance from their higher-level entities to allow the degraded machines to: restore themselves to a healthy state, run updates, or further diagnose issues with the degraded machines). In a further example, the rule 154 can require that the action module 152 mark an alert as mitigated when the higher-level entity transitions from an unhealthy 144 state back to a healthy 142 state.

As further described below, the technical benefits of the techniques described herein are able to correlate 126 the health of lower-level cloud resources 108 to a broader health determination for a particular service 116, 118 or other type of higher-level entity 106 in a manner that is not hindered when a large number of alerts are triggered at the cloud resource 108 level. Consequently, the directed graph health model 102 is equipped with modules that reduce the noise created by the large number of alerts and limit the amount of information that needs to be processed or manually reviewed.

Figure 2A:
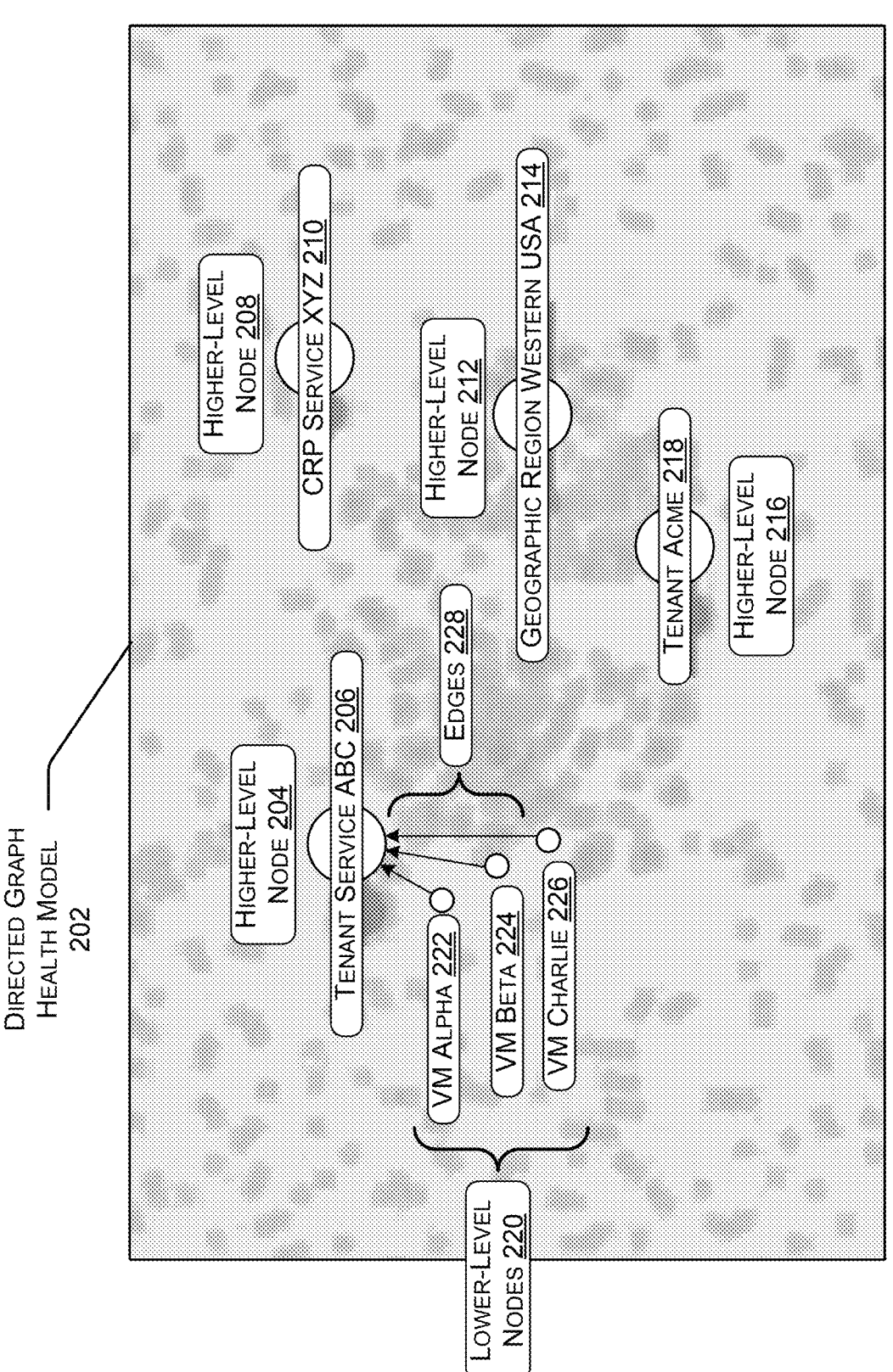
FIG. 2A illustrates an example directed graph health model with nodes and edges between a higher-level node and a lower-level node.

FIG. 2A illustrates an example directed graph health model 202 with nodes and edges between a higher-level node and a lower-level node. As described above, the directed graph health model 202 defines dependencies between nodes within the system 100, and a node can represent a lower-level entity 104 or a higher-level entity 106.

In one example, the directed graph health model 202 includes nodes that represent all the entities in the system 100. Accordingly, each entity, and by association each node, includes an identification parameter and a type parameter. For ease of discussion, a limited number of nodes are called out in the examples of FIG. 2A through 2D.

For example, the directed graph health model 202 includes a first higher-level node 204 named "Tenant Service ABC" 206. In the example of FIG. 2A, the name reflects the identification parameter because "Tenant Service ABC" distinguishes the higher-level entity 106 represented by the higher-level node 204 from other higher-level entities (e.g., "Tenant Service DEF"). Moreover, in the example of FIG. 2A, the name reveals the type of the higher-level entity 106 (e.g., a tenant service 116). The directed graph health model 202 further includes a second higher-level node 208 named "CRP Service XYZ" 210, a third higher-level node 212 named "Geographic Region Western USA" 214, and a fourth higher-level node 216 named "Tenant Acme" 218.

The directed graph health model 202 also includes lower-level nodes 220 named "VM Alpha" 222, "VM Beta" 224, and "VM Charlie" 226. As described above, a directed graph health model is configured to capture the dependencies between entities using edges that connect respective pairs of nodes. In one example, an edge represents the dependency between a higher-level node that represents a higher-level entity and a lower-level node that represents a lower-level entity. As shown in FIG. 2A, edges 228 connect lower-level nodes 220 named "VM Alpha" 222, "VM Beta" 224, and "VM Charlie" 226 to the higher-level node 204 named "Tenant Service ABC" 206.

Furthering the discussion of FIG. 1 above, the directed graph health model 202 is configured to determine when a state of the higher-level node 204 named "Tenant Service ABC" 206 is in one of the predefined set of higher-level health categories (e.g., healthy 142, unhealthy 144, degraded 146, unknown 148) based on the health determination of the lower-level nodes 220. For example, if the lower-level nodes 220 represent the total number of active lower-level entities connected to "Tenant Service ABC" 206, the threshold 150 for "Tenant Service ABC" 206 is fifty percent, and "VM Alpha" 222 and "VM Beta" 224 are determined to be unhealthy 138 (i.e., leaving only "VM Charlie" 226 as a healthy 136 virtual machine), then "Tenant Service ABC" 206 is also determined to be unhealthy 144 as thirty-three percent is less than the threshold fifty percent. However, if only "VM Alpha" 222 is determined to be unhealthy 138 (i.e., "VM Beta" 224 and "VM Charlie" 226 are both healthy 136 virtual machines), then "Tenant Service ABC" 206 is also determined to be healthy 142 as sixty-six percent is greater than the threshold fifty percent.

Figure 2B:
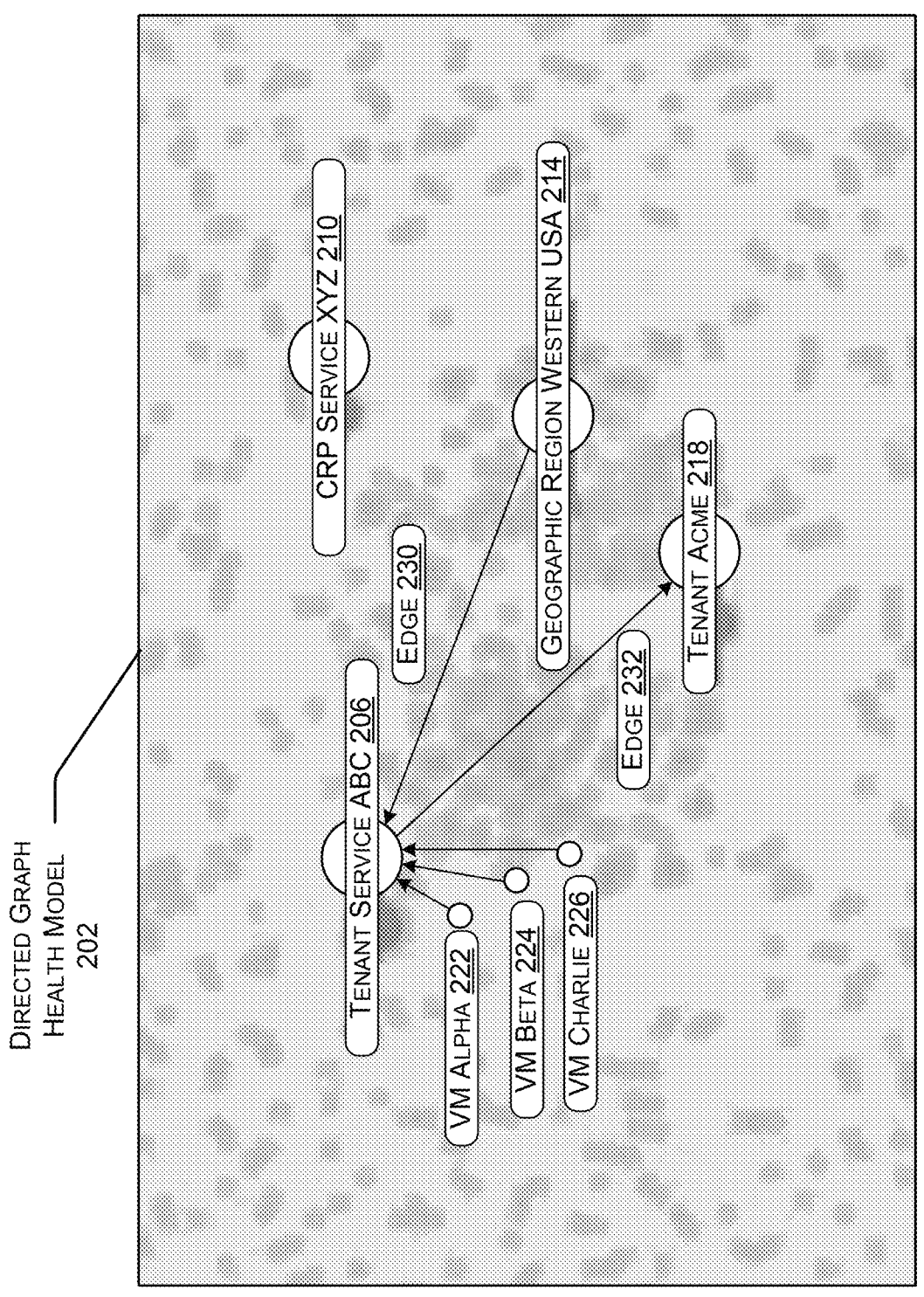
FIG. 2B illustrates the example directed graph health model of FIG. 2A with an edge between a higher-level node and another higher-level node.

FIG. 2B illustrates the example directed graph health model of FIG. 2A with an edge between a higher-level node and another higher-level node. An edge in a directed graph health model can additionally represent a dependency between a pair of higher-level nodes that represent a pair of higher-level entities. For example, the "Tenant Service ABC" 206 is executed in the "Geographic Region Western USA" 214, and thus, this dependency is represented by edge 230. Moreover, the "Tenant Service ABC" 206 is owned by the "Tenant Acme" 218, and thus, this dependency is represented by edge 232. It is further noted that an edge can also represent a dependency between a pair of lower-level nodes that represent a pair of lower-level entities. For example, data processed by a virtual machine may be processed in accordance with keys retrieved from a key vault instance, and thus, the virtual machine depends on the key vault instance.

Figure 2C:
FIG. 2C illustrates the example directed graph health model of FIG. 2A which can be displayed so that a user can view health-related information by interacting with the directed graph health model.

FIG. 2C illustrates the example directed graph health model 202 of FIG. 2A, which can be displayed so that a user 234 (e.g., an Information Technology (IT) agent for "Acme") can view health-related information by interacting with the directed graph health model 202. Consequently, the system 100 enables the directed graph health model 102 to be displayed on a display device of service owners (e.g., tenants, cloud resource providers) via an account-based portal.

In FIG. 2C, the directed graph health model 202 determines that the user 234 is associated with "Acme" via the verification of account credentials (e.g., a user identification along with authorization measures such as a password). Accordingly, the directed graph health model 202 is displayed on a device of the user 234. The directed graph health model 202 is configured to highlight high-level entities and nodes connected to the high-level node named "Tenant Acme" 218. When the user provides input that selects a higher-level entity via a corresponding node in the directed graph health model 202 (e.g., the user 234 navigates a cursor to select the node representing "Tenant Service ABC" 206), the directed graph health model 202 is configured to display a graphical indication of the health state of the higher-level entity.

Continuing the example from FIG. 2A where "Tenant Service ABC" 206 is determined to be unhealthy 144 because only thirty-three percent of the virtual machines on which it depends are healthy and this number is less than the threshold fifty percent, the directed graph health model 202 graphically indicates that "Tenant Service ABC" 206 is "unhealthy" 236 by labeling it as such. Similarly, the directed graph health model 202 can graphically indicate the health of the lower-level entities that caused the "Tenant Service ABC" 206 to be labeled "unhealthy" 236. That is, "VM Alpha" 222 is labeled unhealthy 238 and "VM Beta 224" is labeled unhealthy 240, while "VM Charlie" 226 is labeled healthy 242.

Accordingly, based on a user selection of a higher-level entity, the system 100 can display the identification parameters, type parameters, and health information associated with the selected higher-level entity as well as the lower-level entities used to determine the health of the higher-level entity.

Figure 2D:
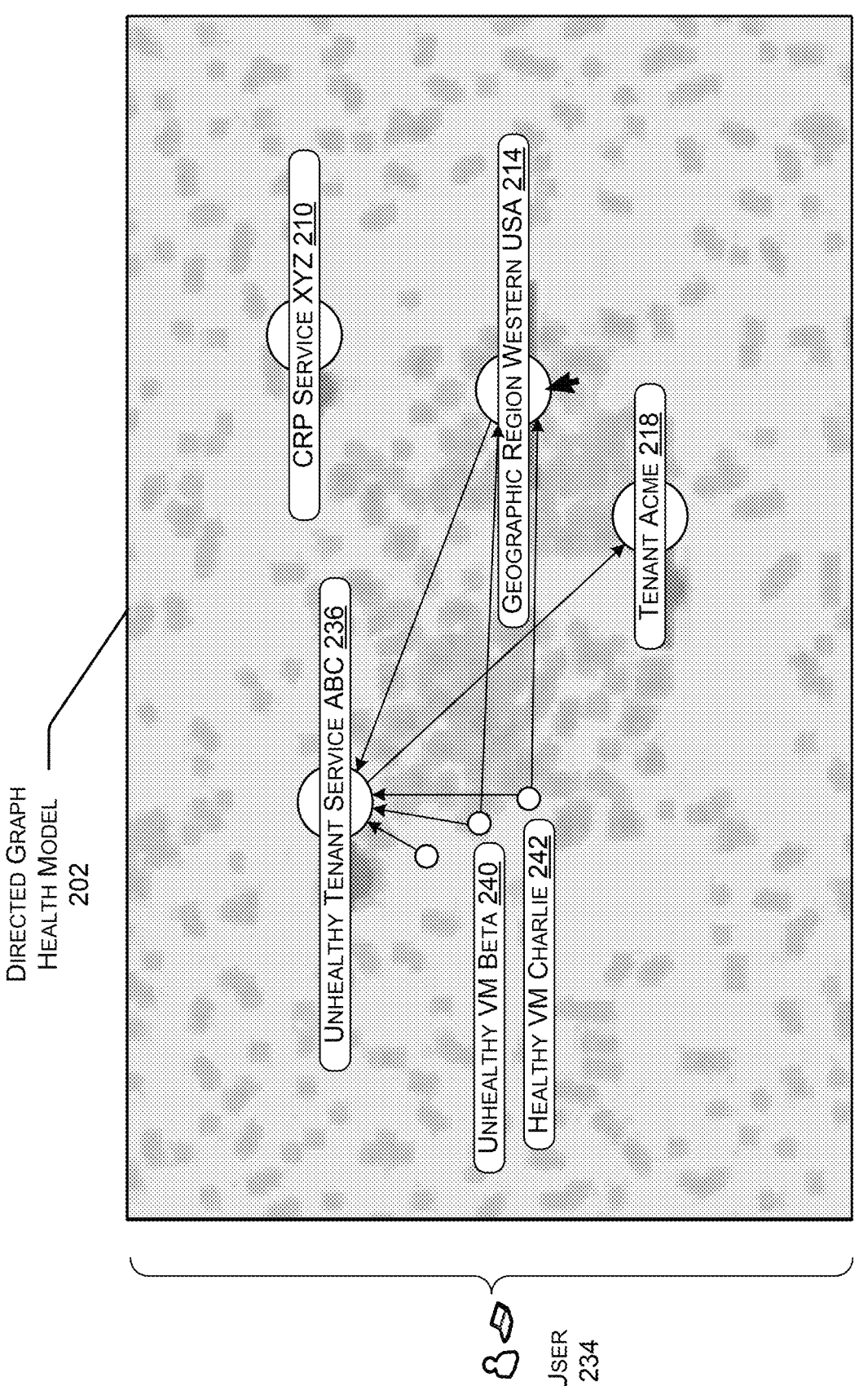
FIG. 2D illustrates the example directed graph health model of FIG. 2C, where the identification of lower-level entities and/or related health information is limited to lower-level nodes that are connected to multiple higher-level nodes.

In further examples, the directed graph health model 202 can receive another user selection of another higher-level entity. When the other higher-level entity is connected to a previously selected higher level entity via a respective edge, the directed graph health model can update the display of the identification parameters to those that are connected to both the previously selected higher-level entity and the other higher-level entity. For example, FIG. 2D illustrates the example directed graph health model of FIG. 2C, where the identification of lower-level entities and/or related health information is limited to lower-level nodes that are connected to multiple higher-level nodes. More specifically, after selecting the higher-level node representing the "Tenant Service ABC" 206 and seeing the identification and health-related information in FIG. 2C, the user 234 selects the higher-level node representing the "Geographic Region Western USA" 214 (e.g., via the cursor). Now that two higher-level nodes have been selected, the directed graph health model 202 is configured to identify the lower-level entities that are common to both the "Tenant Service ABC" 206 and the "Geographic Region Western USA" 214, and only display the identification and health-related information of the common lower-level entities. In this example, the identification and health information for "VM Alpha" 222 is removed as "VM Alpha" 222 is not connected to the "Geographic Region Western USA" 214. In contrast, the identification and health information for "VM Beta" 224 and "VM Charlie 226" remains as "VM Beta" 224 and "VM Charlie 226" are connected to the "Geographic Region Western USA" 214 via edges (not previously shown in FIGS. 2A through 2C).

Accordingly, after viewing a number of lower-level entities that are unhealthy with respect to a first higher-level entity (e.g., a particular service), a user can view a smaller number of lower-level entities that are unhealthy with respect to a second higher-level entity that is dependent upon the first higher-level entity (e.g., the smaller number of lower-level entities are common to both the first and second higher-level entities).

Figure 3:
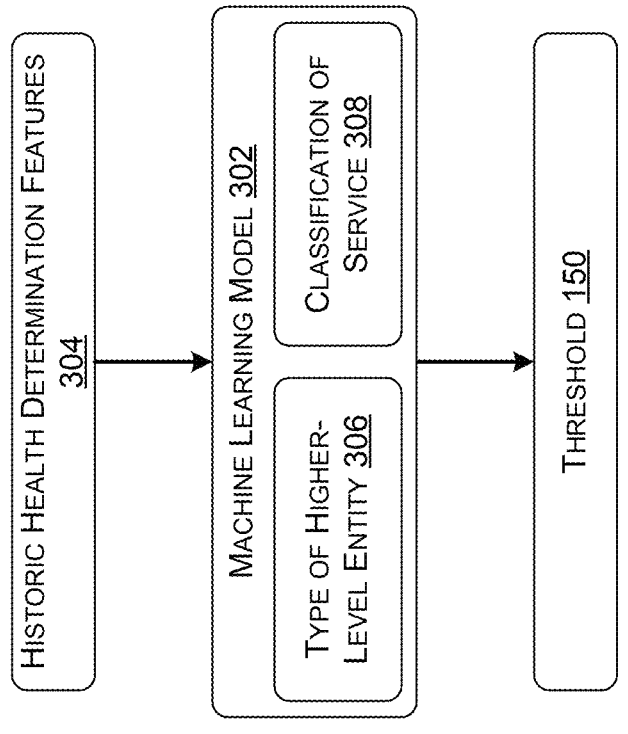
FIG. 3 illustrates how machine learning can be used to establish the threshold that is useable to determine when a state of a higher-level entity is in one of a predefined set of higher-level health categories (e.g., healthy, unhealthy, degraded, unknown).

FIG. 3 illustrates how machine learning can be used to establish the threshold that is useable to determine that a state of a higher-level entity is in one of a predefined set of higher-level health categories (e.g., healthy 142, unhealthy 144, degraded 146, and unknown 148). Accordingly, FIG. 3 illustrates a machine learning model 302. The machine learning model 302 can be any type of predictive model that can be applied to features 304 extracted from scenarios where the health of a higher-level entity has been determined. For example, during a training stage, the machine learning model is trained using a training data set that includes labeled health states (e.g., an indication of performance) for the higher-level entity (e.g., healthy, unhealthy, degraded, unknown). The feature extraction performed with respect to the training data set can reflect the current health states of each of the lower-level entities upon which the higher-level entity depends. Consequently, the machine learning model is trained to map the aggregate health of the lower-level entities to a threshold that reflects a state transition for the higher-level entity. The machine learning model 302 can use any one of neural networks (e.g., convolutional neural networks, recurrent neural networks such as Long Short-Term Memory), Gated Adaptive Network for Deep Automated Learning of Features, Naïve Bayes, k-nearest neighbor algorithm, majority classifier, support vector machines, random forests, boosted trees, Classification and Regression Trees (CART), and so on in order to predict when the performance of the higher-level entity is degraded to a minimum threshold performance.

In various examples, the machine learning model 302 is tailored to a specific type of higher-level entity 306 (e.g., a service) and/or a sub-type of a higher-level entity such as a classification of a service 308 (e.g., a transaction processing service compared to a messaging service). For example, the training data set described in the previous paragraph can be sorted according to different classifications of the higher-level entity, so different machine learning models can establish different thresholds. The machine learning model 302 enables the threshold 150 to be established to indicate when the state of the higher-level entity is in one of a predefined set of higher-level health categories. Consequently, any tenant or cloud resource provider can benefit from the directed graph health model described herein, as no specific tenant input or cloud resource provider input is needed (i.e., the directed graph health model is a standard model).

Figure 4:
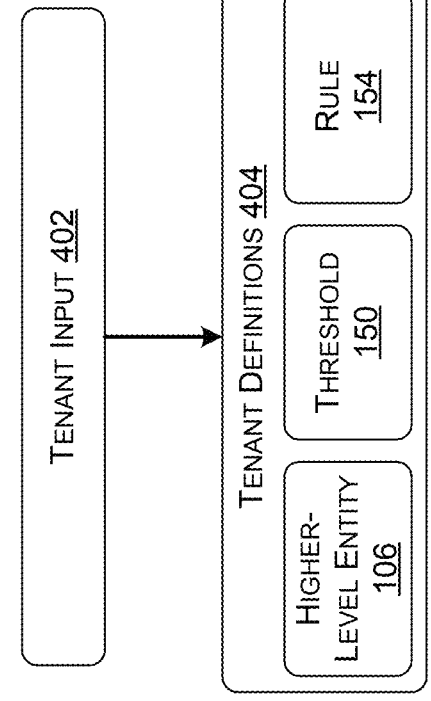
FIG. 4 illustrates how tenant input can be used to define aspects of the directed graph health model.

FIG. 4 illustrates how tenant input 402 can be used to define aspects of the directed graph health model. More specifically, the tenant input 402 can relate to tenant definitions 404 of a high-level entity 106, the threshold 150 established to indicate when the state of the higher-level entity 106 is in one of a predefined set of higher-level health categories, and the rule 154 that guides the action 156 executed in response to determining when the higher-level entity 106 is in one of a predefined set of higher-level health categories. These tenant definitions 404 allow a tenant to impress their own perspective on health states for the higher-level entity, and what action to take in response. Accordingly, while the health model described herein can be a standard health model in its original form, it can include an adaptable layer that enables tenant customization.

Proceeding to FIG. 5, aspects of a process 500 for correlating the health of cloud resources to a broader health determination for an entity executing within a distributed computing environment are shown and described. The process 500 begins at operation 502 where a system generates a directed graph health model that defines dependencies between nodes within a distributed computing environment.

As described above, the nodes include lower-level nodes representing lower-level entities and higher-level nodes representing higher-level entities. As described above, each lower-level entity and each higher-level entity comprises an identification parameter to distinguish one entity from a next entity. Example types of higher-level entities include a tenant service type higher-level entity, a cloud resource provider service type higher-level entity, a geographic region type higher-level entity, a tenant type higher-level entity, or a cloud resource provider type higher-level entity. Example types of lower-level entities comprising a virtual machine type lower-level entity, a storage unit type lower-level entity, a container type lower-level entity, a physical server type lower-level entity, a network switch type lower-level entity, a container registry type lower-level entity, a key vault instance type lower-level entity, or a micro-service type lower-level entity.

At operation 504, the directed graph health model monitors values of a plurality of metrics that are collected in association with use of an individual lower-level entity.

At operation 506, the directed graph health model categorizes the individual lower-level entity as one of healthy or unhealthy by applying an anomaly detection algorithm to the values of the plurality of metrics.

At operation 508, the directed graph health model determines a number of lower-level entities have been categorized as unhealthy, where each lower-level entity is connected to a higher-level entity in the directed graph health model via a respective edge.

At operation 510, the directed graph health model determine that the number of lower-level entities satisfies a threshold established to indicate when a state of the higher-level entity is unhealthy. In one example, the threshold defines a percentage of a total number of lower-level entities connected to the higher-level entity in the directed graph health model. In another example, the threshold is determined by a machine learning model configured to predict when a performance of the higher-level entity is degraded to a minimum threshold performance.

At operation 512, the directed graph health model accesses a rule associated with the higher-level entity. The rule defines an action to execute for the higher-level entity when the state of the higher-level entity is unhealthy. In various examples, the higher-level entity, the threshold, and the rule are defined based on input from a tenant that owns the higher-level entity.

At operation 514, the directed graph health model executes the action for the higher-level entity. For example, the action can include providing, to an owner of the higher-level entity, a notification indicating that the state of the higher-level entity is unhealthy. In another example, the action can include transitioning the state of the higher-level entity from unhealthy to healthy by allocating cloud resources to the higher-level entity. In yet another example, the action can include transitioning the state of the higher-level entity from unhealthy to healthy by implementing a set of mitigation measures on the number of lower-level entities entity, wherein the set of mitigation measures is defined by the rule.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the process 500 may also be implemented in other ways. In addition, one or more of the operations of the process 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
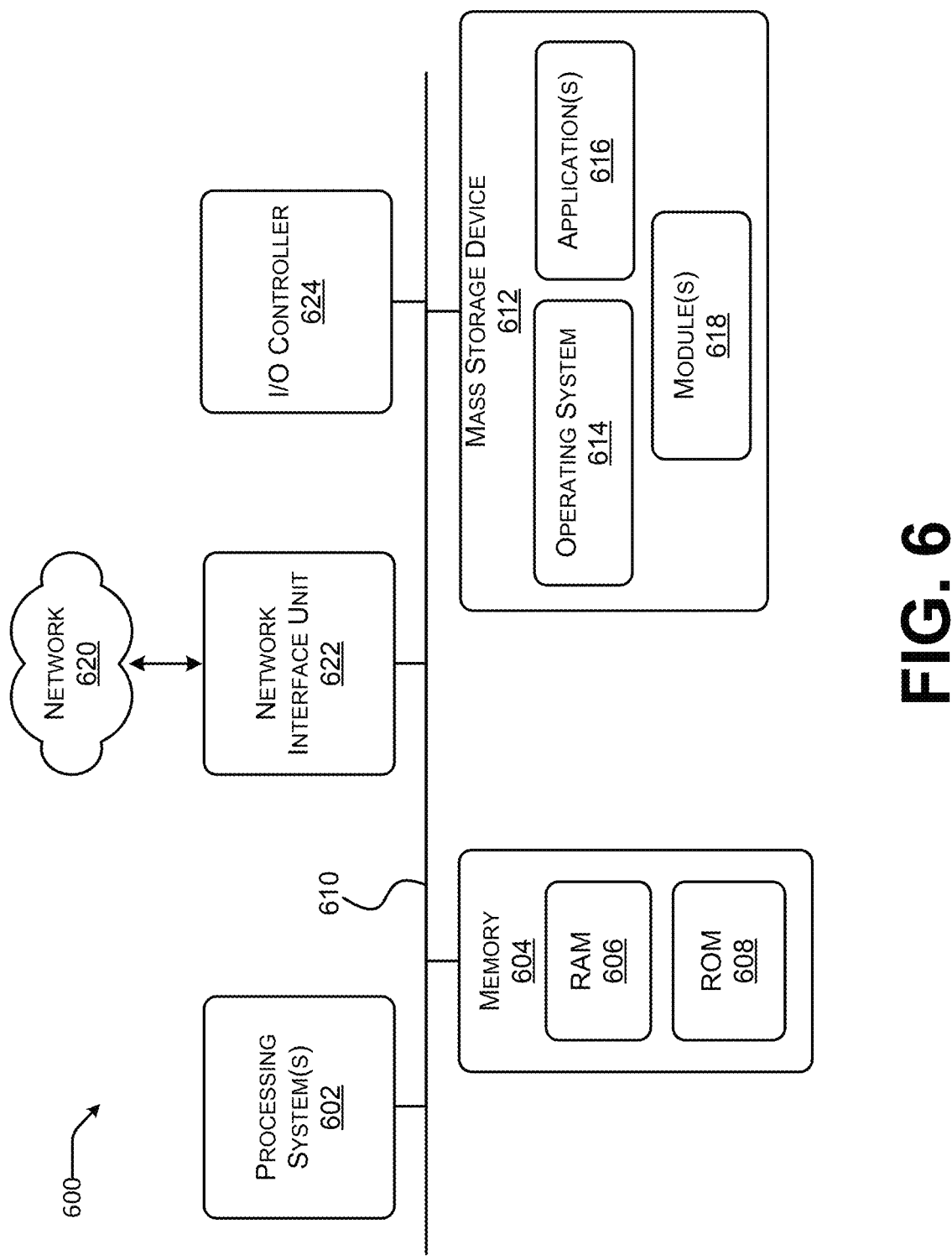
FIG. 6 is an example computing system in accordance with the present disclosure.

FIG. 6 shows additional details of an example computer architecture 600 for a device, such as a computer or a server configured as part of the system 100, capable of executing computer instructions (e.g., a module described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location. Moreover, the systems discussed herein can be provided as a distributed computing system such as a cloud service.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

The disclosure presented herein also encompasses the subject matter set forth in the following clauses.

Example Clause A, a method comprising: generating a directed graph health model that defines dependencies between nodes within a distributed computing environment, wherein: the nodes include lower-level nodes representing lower-level entities; the nodes include higher-level nodes representing higher-level entities; and edges that connect respective pairs of nodes, the edges representing dependencies between the respective pairs of nodes; for an individual lower-level entity of the lower-level entities: monitoring, by the directed graph health model, values of a plurality of metrics that are collected in association with use of the individual lower-level entity; and categorizing, by the directed graph health model, the individual lower-level entity as one of healthy or unhealthy by applying an anomaly detection algorithm to the values of the plurality of metrics; determining, by the directed graph health model, a number of lower-level entities have been categorized as unhealthy, wherein each lower-level entity in the number of lower-level entities is connected to a higher-level entity in the directed graph health model via a respective edge; determining, by the directed graph health model, that the number of lower-level entities satisfies a threshold established to indicate that a state of the higher-level entity is unhealthy; in response to determining that the number of lower-level entities satisfies the threshold, accessing, by the directed graph health model, a rule associated with the higher-level entity, the rule defining an action to execute for the higher-level entity when the state of the higher-level entity is unhealthy; and executing, by the directed graph health model, the action for the higher-level entity.

Example Clause B, the method of Example Clause A, wherein the action comprises one of: providing, to an owner of the higher-level entity, a notification indicating that the state of the higher-level entity is unhealthy; transitioning the state of the higher-level entity from unhealthy to healthy by allocating cloud resources to the higher-level entity; or transitioning the state of the higher-level entity from unhealthy to healthy by implementing a set of mitigation measures on the number of lower-level entities entity, wherein the set of mitigation measures is defined by the rule.

Example Clause C, the method of Example Clause A or Example Clause B, wherein each lower-level entity of the lower-level entities and each higher-level entity of the higher-level entities comprises an identification parameter to distinguish one entity from a next entity.

Example Clause D, the method of Example Clause C, wherein the higher-level entities are different types of higher-level entities, the different types of higher-level entities comprising a tenant service type higher-level entity, a cloud resource provider service type higher-level entity, a geographic region type higher-level entity, a tenant type higher-level entity, or a cloud resource provider type higher-level entity.

Example Clause E, the method of Example Clause D, wherein the threshold established to indicate when the state of the higher-level entity is unhealthy is established based on a type of the higher-level entity.

Example Clause F, the method of any one of Example Clauses C through E, wherein the lower-level entities are of different types of lower-level entities, the different types of lower-level entities comprising a virtual machine type lower-level entity, a storage unit type lower-level entity, a container type lower-level entity, a physical server type lower-level entity, a network switch type lower-level entity, a container registry type lower-level entity, a key vault instance type lower-level entity, or a micro-service type lower-level entity.

Example Clause G, the method of any one of Example Clauses C through F, further comprising: causing the directed graph health model to be displayed on a display device along with a graphical indication that the state of the higher-level entity is unhealthy; receiving a user selection of the higher-level entity via the directed graph health model caused to be displayed on the display device; and based on the user selection, causing the identification parameters associated with the number of lower-level entities that have been categorized as unhealthy to be displayed.

Example Clause H, the method of Example Clause G, further comprising: receiving another user selection of another higher-level entity via the directed graph health model caused to be displayed on the display device, wherein the higher-level entity is connected to the other higher-level entity via a respective edge in the directed graph health model; and causing an update to the identification parameters associated with the number of lower-level entities that have been categorized as unhealthy to be displayed, wherein the update reduces the number of lower-level entities that have been categorized as unhealthy to those that are connected to both the higher-level entity and the other higher-level entity in the directed graph health model.

Example Clause I, the method of any one of Example Clauses A through H, wherein the threshold defines a percentage of a total number of lower-level entities connected to the higher-level entity in the directed graph health model.

Example Clause J, the method of Example Clause I, wherein the percentage and the total number of lower-level entities are specific to a type of lower-level entity.

Example Clause K, the method of any one of Example Clauses A through J, wherein the threshold is determined by a machine learning model configured to predict when a performance of the higher-level entity is degraded to a minimum threshold performance.

Example Clause L, the method of any one of Example Clauses A through J, wherein the higher-level entity, the threshold, and the rule are defined based on input from a tenant of the distributed computing environment, wherein the tenant owns the higher-level entity.

Example Clause M, a system comprising: a processing system; and a computer readable storage medium storing instructions that, when executed by the processing system, cause the system to perform operations comprising: generating a directed graph health model that defines dependencies between nodes within a distributed computing environment, wherein: the nodes include lower-level nodes representing lower-level entities; the nodes include higher-level nodes representing higher-level entities; and edges that connect respective pairs of nodes, the edges representing dependencies between the respective pairs of nodes; for an individual lower-level entity of the lower-level entities: monitoring, via the directed graph health model, values of a plurality of metrics that are collected in association with use of the individual lower-level entity; and categorizing, via the directed graph health model, the individual lower-level entity as one of healthy or unhealthy by applying an anomaly detection algorithm to the values of the plurality of metrics; determining, via the directed graph health model, a number of lower-level entities have been categorized as unhealthy, wherein each lower-level entity in the number of lower-level entities is connected to a higher-level entity in the directed graph health model via a respective edge; determining, via the directed graph health model, that the number of lower-level entities satisfies a threshold established to indicate that a state of the higher-level entity is unhealthy; in response to determining that the number of lower-level entities satisfies the threshold, accessing, via the directed graph health model, a rule associated with the higher-level entity, the rule defining an action to execute for the higher-level entity when the state of the higher-level entity is unhealthy; and executing, via the directed graph health model, the action for the higher-level entity.

Example Clause N, the system of Example Clause M, wherein the operations further comprise: causing the directed graph health model to be displayed on a display device along with a graphical indication that the state of the higher-level entity is unhealthy; receiving a user selection of the higher-level entity via the directed graph health model caused to be displayed on the display device; and based on the user selection, causing the identification parameters associated with the number of lower-level entities that have been categorized as unhealthy to be displayed.

Example Clause O, the system of Example Clause M or Example Clause N, wherein the threshold defines a percentage of a total number of lower-level entities connected to the higher-level entity in the directed graph health model.

Example Clause P, the system of any one of Example Clauses M through O, wherein the higher-level entity, the threshold, and the rule are defined based on input from a tenant of the distributed computing environment, wherein the tenant owns the higher-level entity.

Example Clause Q, a method comprising: generating a directed graph health model that defines dependencies between nodes within a distributed computing environment, wherein: the nodes include lower-level nodes representing lower-level entities; the nodes include higher-level nodes representing higher-level entities; and edges that connect respective pairs of nodes, the edges representing dependencies between the respective pairs of nodes; for an individual lower-level entity of the lower-level entities: monitoring, by the directed graph health model, values of a plurality of metrics that are collected in association with use of the individual lower-level entity; and categorizing, by the directed graph health model, the individual lower-level entity into one of a predefined set of health categories; determining, by the directed graph health model, a number of lower-level entities have been categorized into a particular one of the predefined set of lower-level health categories, wherein each lower-level entity in the number of lower-level entities is connected to a higher-level entity in the directed graph health model via a respective edge; determining, by the directed graph health model, that the number of lower-level entities satisfies a threshold established to indicate that a state of the higher-level entity has changed; in response to determining that the number of lower-level entities satisfies the threshold, accessing, by the directed graph health model, a rule associated with the higher-level entity, the rule defining an action to execute for the higher-level entity when the state of the higher-level entity changes; and executing, by the directed graph health model, the action for the higher-level entity.

Example Clause R, the method of Example Clause Q, wherein the threshold defines a percentage of a total number of lower-level entities connected to the higher-level entity in the directed graph health model.

Example Clause S, the method of Example Clause Q or Example Clause R, wherein: the predefined set of health categories includes healthy, unhealthy, and unknown; and the state of the higher-level entity changes to one of a healthy state, an unhealthy state, a degraded state, or an unknown state.

Example Clause T, the method of any one of Example Clauses Q through S, wherein the higher-level entity, the threshold, and the rule are defined based on input from a tenant of the distributed computing environment, wherein the tenant owns the higher-level entity.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:

generating a directed graph health model that defines dependencies between nodes within a distributed computing environment, wherein:

the nodes include lower-level nodes representing lower-level entities;

the nodes include higher-level nodes representing higher-level entities; and edges that connect respective pairs of nodes, the edges representing dependencies between the respective pairs of nodes;

for an individual lower-level entity of the lower-level entities:

monitoring, by the directed graph health model, values of a plurality of metrics that are collected in association with use of the individual lower-level entity; and categorizing, by the directed graph health model, the individual lower-level entity as one of healthy or unhealthy by applying an anomaly detection algorithm to the values of the plurality of metrics;

determining, by the directed graph health model, a number of lower-level entities have been categorized as unhealthy, wherein each lower-level entity in the number of lower-level entities is connected to a higher-level entity in the directed graph health model via a respective edge;

determining, by the directed graph health model, that the number of lower-level entities satisfies a threshold established to indicate that a state of the higher-level entity is unhealthy, wherein:

the threshold defines a percentage of a total number of lower-level entities connected to the higher-level entity in the directed graph health model; and the percentage and the total number of lower-level entities are specific to a type of lower-level entity;

in response to determining that the number of lower-level entities satisfies the threshold, accessing, by the directed graph health model, a rule associated with the higher-level entity, the rule defining an action to execute for the higher-level entity when the state of the higher-level entity is unhealthy; and executing, by the directed graph health model, the action for the higher-level entity.

2. The method of claim 1, wherein the action comprises one of:

providing, to an owner of the higher-level entity, a notification indicating that the state of the higher-level entity is unhealthy;

transitioning the state of the higher-level entity from unhealthy to healthy by allocating cloud resources to the higher-level entity; or transitioning the state of the higher-level entity from unhealthy to healthy by implementing a set of mitigation measures on the number of lower-level entities, wherein the set of mitigation measures is defined by the rule.

3. The method of claim 1, wherein each lower-level entity of the lower-level entities and each higher-level entity of the higher-level entities comprises an identification parameter to distinguish one entity from a next entity.

4. The method of claim 3, wherein the higher-level entities are different types of higher-level entities, the different types of higher-level entities comprising a tenant service type higher-level entity, a cloud resource provider service type higher-level entity, a geographic region type higher-level entity, a tenant type higher-level entity, or a cloud resource provider type higher-level entity.

5. The method of claim 4, wherein the threshold established to indicate when the state of the higher-level entity is unhealthy is established based on a type of the higher-level entity.

6. The method of claim 3, wherein the lower-level entities are of different types of lower-level entities, the different types of lower-level entities comprising a virtual machine type lower-level entity, a storage unit type lower-level entity, a container type lower-level entity, a physical server type lower-level entity, a network switch type lower-level entity, a container registry type lower-level entity, a key vault instance type lower-level entity, or a micro-service type lower-level entity.

7. The method of claim 3, further comprising:

causing the directed graph health model to be displayed on a display device along with a graphical indication that the state of the higher-level entity is unhealthy;

receiving a user selection of the higher-level entity via the directed graph health model caused to be displayed on the display device; and based on the user selection, causing the identification parameters associated with the number of lower-level entities that have been categorized as unhealthy to be displayed.

8. The method of claim 7, further comprising:

receiving another user selection of another higher-level entity via the directed graph health model caused to be displayed on the display device, wherein the higher-level entity is connected to the other higher-level entity via a respective edge in the directed graph health model; and causing an update to the identification parameters associated with the number of lower-level entities that have been categorized as unhealthy to be displayed, wherein the update reduces the number of lower-level entities that have been categorized as unhealthy to those that are connected to both the higher-level entity and the other higher-level entity in the directed graph health model.

9. The method of claim 1, wherein the threshold is determined by a machine learning model configured to predict when a performance of the higher-level entity is degraded to a minimum threshold performance.

10. The method of claim 1, wherein the higher-level entity, and the rule are defined based on input from a tenant of the distributed computing environment, wherein the tenant owns the higher-level entity.

11. A system comprising:

a processing system; and a computer readable storage medium storing instructions that, when executed by the processing system, cause the system to perform operations comprising:

generating a directed graph health model that defines dependencies between nodes within a distributed computing environment, wherein:

the nodes include lower-level nodes representing lower-level entities;

the nodes include higher-level nodes representing higher-level entities; and edges that connect respective pairs of nodes, the edges representing dependencies between the respective pairs of nodes;

for an individual lower-level entity of the lower-level entities:

monitoring, via the directed graph health model, values of a plurality of metrics that are collected in association with use of the individual lower-level entity; and categorizing, via the directed graph health model, the individual lower-level entity as one of healthy or unhealthy by applying an anomaly detection algorithm to the values of the plurality of metrics;

determining, via the directed graph health model, a number of lower-level entities have been categorized as unhealthy, wherein each lower-level entity in the number of lower-level entities is connected to a higher-level entity in the directed graph health model via a respective edge;

determining, via the directed graph health model, that the number of lower-level entities satisfies a threshold established to indicate that a state of the higher-level entity is unhealthy, wherein:

the threshold defines a percentage of a total number of lower-level entities connected to the higher-level entity in the directed graph health mode; and the threshold is determined by a machine learning model;

in response to determining that the number of lower-level entities satisfies the threshold, accessing, via the directed graph health model, a rule associated with the higher-level entity, the rule defining an action to execute for the higher-level entity when the state of the higher-level entity is unhealthy; and executing, via the directed graph health model, the action for the higher-level entity.

12. The system of claim 11, wherein the operations further comprise:

causing the directed graph health model to be displayed on a display device along with a graphical indication that the state of the higher-level entity is unhealthy;

receiving a user selection of the higher-level entity via the directed graph health model caused to be displayed on the display device; and based on the user selection, causing the identification parameters associated with the number of lower-level entities that have been categorized as unhealthy to be displayed.

13. The system of claim 11, wherein the higher-level entity, and the rule are defined based on input from a tenant of the distributed computing environment, wherein the tenant owns the higher-level entity.

14. A method comprising:

generating a directed graph health model that defines dependencies between nodes within a distributed computing environment, wherein:

the nodes include lower-level nodes representing lower-level entities;

the nodes include higher-level nodes representing higher-level entities; and edges that connect respective pairs of nodes, the edges representing dependencies between the respective pairs of nodes;

for an individual lower-level entity of the lower-level entities:

monitoring, by the directed graph health model, values of a plurality of metrics that are collected in association with use of the individual lower-level entity; and categorizing, by the directed graph health model, the individual lower-level entity into one of a predefined set of health categories;

determining, by the directed graph health model, a number of lower-level entities have been categorized into a particular one of the predefined set of lower-level health categories, wherein each lower-level entity in the number of lower-level entities is connected to a higher-level entity in the directed graph health model via a respective edge;

determining, by the directed graph health model, that the number of lower-level entities satisfies a threshold established to indicate that a state of the higher-level entity has changed, wherein:

the threshold defines a percentage of a total number of lower-level entities connected to the higher-level entity in the directed graph health model; and the percentage and the total number of lower-level entities are specific to a type of lower-level entity;

in response to determining that the number of lower-level entities satisfies the threshold, accessing, by the directed graph health model, a rule associated with the higher-level entity, the rule defining an action to execute for the higher-level entity when the state of the higher-level entity changes; and executing, by the directed graph health model, the action for the higher-level entity.

15. The method of claim 14, wherein:

the predefined set of health categories includes healthy, unhealthy, and unknown; and the state of the higher-level entity changes to one of a healthy state, an unhealthy state, or an unknown state.

16. The method of claim 15, wherein the higher-level entity, and the rule are defined based on input from a tenant of the distributed computing environment, wherein the tenant owns the higher-level entity.

* * * * *